United States Patent
Hung

(10) Patent No.: US 9,462,113 B2
(45) Date of Patent: Oct. 4, 2016

(54) METHODS AND SYSTEMS FOR ALARM MANAGEMENT IN AN ELECTRONIC DEVICE

(71) Applicant: HTC Corporation, Taoyuan, Taoyuan County (TW)

(72) Inventor: Kuo-Chih Hung, Taoyuan (TW)

(73) Assignee: HTC CORPORATION, Taoyuan (TW)

(*) Notice: Subject to any disclaimer, the term of this patent is extended or adjusted under 35 U.S.C. 154(b) by 48 days.

(21) Appl. No.: 14/307,751

(22) Filed: Jun. 18, 2014

(65) Prior Publication Data

US 2015/0371524 A1 Dec. 24, 2015

(51) Int. Cl.
| G08B 21/00 | (2006.01) |
| H04M 1/725 | (2006.01) |
| G04G 13/02 | (2006.01) |
| G04G 21/06 | (2010.01) |
| H04M 1/03 | (2006.01) |

(52) U.S. Cl.
CPC ....... H04M 1/72566 (2013.01); G04G 13/026 (2013.01); G04G 21/06 (2013.01); H04M 1/03 (2013.01); H04M 2250/12 (2013.01)

(58) Field of Classification Search
CPC .... G04G 13/026; G04G 15/00; G04G 21/06; G04G 13/021; G04G 13/02; G01P 15/0891; H04Q 9/02; G08B 25/016; G06K 9/00664
USPC ........ 340/669, 686.1, 539.11, 573.1, 539.13; 368/263, 11, 250, 10, 244, 73
See application file for complete search history.

(56) References Cited

U.S. PATENT DOCUMENTS

| 6,992,580 B2* | 1/2006 | Kotzin ............... G08B 21/0453 340/539.11 |
| 7,633,836 B2 | 12/2009 | Choi et al. |
| 2003/0142591 A1* | 7/2003 | Baweja ............... G04G 13/023 368/263 |
| 2004/0066710 A1* | 4/2004 | Yuen ..................... G04G 21/06 368/73 |
| 2007/0263490 A1* | 11/2007 | Choi .................... G04G 13/026 368/10 |
| 2008/0259742 A1* | 10/2008 | Tadanori ............. G04G 13/021 368/263 |
| 2010/0128571 A1* | 5/2010 | Roh .................... G04G 13/021 368/11 |
| 2013/0155818 A1 | 6/2013 | Dai |
| 2015/0277388 A1* | 10/2015 | Almudafier ........... G04G 15/00 368/11 |

FOREIGN PATENT DOCUMENTS

| CN | 102385308 A | 3/2012 |
| CN | 103324385 A | 9/2013 |
| TW | 201008224 A | 2/2010 |

OTHER PUBLICATIONS

Samsung, "GT-I9500 User Manual," May, 2013, 6 pages provided, with English translation (URL available in the Taiwanese Office Action and Search Report dated Mar. 10, 2016 for Taiwan Application No. 103129480).
Samsung, "GT-I9500 (Galaxy S4) User Manual," Rev 1.0 (English), Apr. 2013, pp. 1-23, 26-103, 106-146 (Total 143 pages).
Samsung, "GT-I9500 (Galaxy S4) User Manual," Rev 1.1, May 2013, pp. 103-104 (English translation pp. 104-105), Total 6 pages.

* cited by examiner

*Primary Examiner* — Mirza Alam
(74) *Attorney, Agent, or Firm* — Birch, Stewart, Kolasch & Birch, LLP

(57) ABSTRACT

Methods and systems for alarm management for use in an electronic device are provided. First, it is determined whether the electronic device has been flipped over in response to detecting an occurrence of an alarm event. In response to a determination that the electronic device has been flipped over, current alarm is stopped.

12 Claims, 4 Drawing Sheets

METHODS AND SYSTEMS FOR ALARM MANAGEMENT IN AN ELECTRONIC DEVICE

BACKGROUND OF THE INVENTION

1. Field of the Invention

The disclosure relates generally to systems and methods for alarm management and, more particularly, to methods and systems that provide management for a snooze alarm function of an electronic device.

2. Description of the Related Art

Recently, portable devices such as handheld devices have become more and more technically advanced and multifunctional. For example, a handheld device may receive email messages, have an advanced contact management application, allow media playback, and have various other functions. Because of the conveniences of devices with multiple functions, the devices have become necessities of life.

Conventionally, the mobile device, e.g., a mobile phone, has typical alarm functions such as a morning wakeup call, appointment indication and so on. A snooze function is an alarm occurrence that is repeated at regular intervals after an initial alarm indication occurs. For example, the snooze function may be set by a user so as to generate an initial alarm indication at seven o'clock and repeatedly generate subsequent alarm indications four times at intervals of twenty minutes until the user terminates the alarm. In this case, even though a user stops an initial alarm, the snooze function forces the next alarm(s) to occur in ten or predetermined minutes. Additionally, such alarm occurrences are repeated four or predetermined times unless there is a special operation, such as a press of an end button, for disabling the snooze function.

However, to stop a current alarm in a conventional snooze function, a user has to press a specific button, e.g. an end key. Therefore, it is very inconvenient for a user, especially in sleeping, to quickly stop a snooze alarm.

BRIEF SUMMARY OF THE INVENTION

Methods and systems for alarm management for use in an electronic device are provided.

In an embodiment of a method for alarm management for use in an electronic device, it is first determined whether the electronic device has been flipped over in response to detecting an occurrence of an alarm event. Then, in response to a determination that the electronic device has been flipped over, current alarm is stopped.

An embodiment of a system for alarm management for use in an electronic device includes a wireless communication unit and a processing unit. The processing unit is coupled to the wireless communication unit and is configured to determine whether the electronic device has been flipped over in response to detecting an occurrence of an alarm event, and stops current alarm in response to a determination that the device has been flipped over.

In some embodiments, determination of whether the electronic device has been flipped over is based on sensed data provided by a motion sensing device of the electronic device. In some embodiments, determination of whether the electronic device has been flipped over is based on a flipping status of the electronic device. In some embodiments, determination of whether the electronic device has been flipped over is based on image information captured by an image input unit of the electronic device. In some embodiments, determination of whether the electronic device has been flipped over is based on audio signal strengths detected/measured by an audio unit of the electronic device.

Methods for alarm management may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
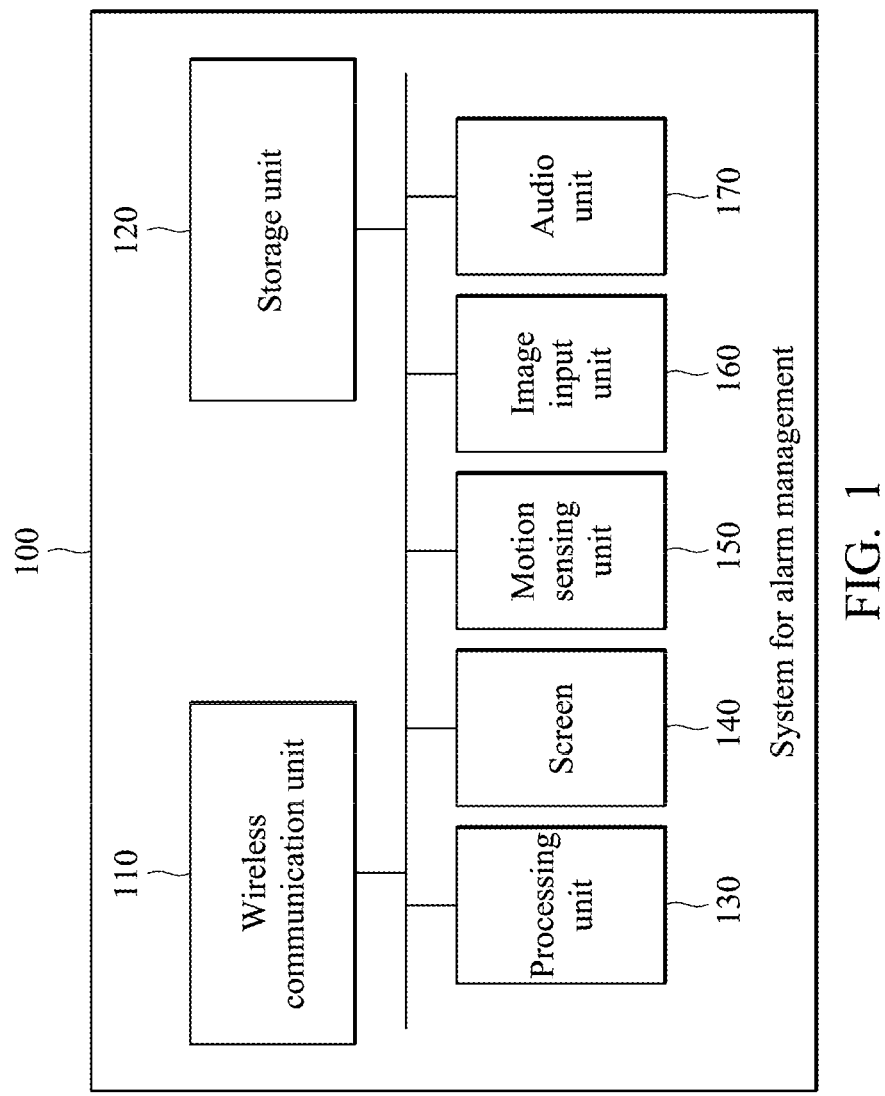
FIG. 1 is a schematic diagram illustrating an embodiment of a system for alarm management of the invention.

FIG. 1 is a schematic diagram illustrating an embodiment of a system for alarm management of the invention. The system for alarm management 100 can be used in an electronic device, such as a PDA (Personal Digital Assistant), a smartphone, a mobile phone, an MID (Mobile Internet Device, MID), a laptop computer, a car computer, a digital camera, a multi-media player, a gaming device, or any other type of mobile computational device, however it is to be understood that the invention is not limited thereto. The system for alarm management 100 at least comprises a wireless communication unit 110, a storage unit 120 and a processing unit 130. The wireless communication unit 110 may perform the functionality of wireless transmission and reception to and from a number of servers, such as social network servers providing social network application (e.g. Facebook, Twitter and so on) or mail servers via a network, such as GSM, CDMA, WCDMA, LTE, Wi-Fi and/or other wired/wireless networks. To further clarify, the wireless communication unit 110 may comprise a baseband unit (not shown) and a radio frequency (RF) unit (not shown). The baseband unit may contain multiple hardware components to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communications system, wherein the radio frequency may be 900 MHz, 1900 MHz, or 2100

MHz utilized in WCDMA systems, or may be 900 MHz, 2100 MHz, or 2.6 GHz utilized in LTE systems, or others depending on the radio access technology (RAT) in use. The processing unit 130 may further control the operation of the wireless communication unit 110 and other functional components, such as a screen unit 140 and/or keypad serving as the MMI (man-machine interface), the storage unit 120 storing the program codes of applications or communication protocols, or others.

The storage unit 120 may include one or more types of computer readable medium, which stores related data. The storage unit 120 may include high-speed random access memory (e.g. SRAM or DRAM) and/or non-volatile memory, such as flash memory.

The processing unit 130 can perform the method for alarm management of the present invention for managing an alarm function (e.g. a snooze alarm function) of the electronic device, which will be discussed further in the following paragraphs. To be more specific, the processing unit 130 may set an alarm including a snooze alarm to sound at a certain time according to predetermined alarm settings so that an alarm event occurs at the certain time. The predetermined alarm settings may include, for example, an alarm type, an alarm hour, an alarm cycle/a snooze time, an alarm frequency, and alarm tone, but the invention is limited thereto. The alarm type can be one-time alarm, repeated alarm, etc, and the certain time is a particular time when the alarm occurs. The alarm cycle or the snooze time is a time interval between two successive occurrences of alarms, and the snooze frequency is the number of alarm repetition. For example, if the alarm settings are set to one-time alarm on Friday (the alarm type), five a.m. (the certain time), ten minutes (the alarm cycle), and four times (the snooze frequency), alarm sounds will occur four times at ten-minute intervals from five a.m. on specified Friday. Unless there is an input for stopping an alarm, the current alarm occurrence continues for 30 seconds, for example.

The system for alarm management 100 may further comprise a screen 140. The screen 140 can display data, such as texts, figures, interfaces, and/or information. It is understood that, in some embodiments, the screen 140 may be integrated with a touch-sensitive unit (not shown). The touch-sensitive unit has a touch-sensitive surface comprising sensors in at least one dimension to detect contact and movement of at least one object (input tool), such as a pen/stylus or finger near or on the touch-sensitive surface. Accordingly, users are able to input commands or signals via the screen.

The system for alarm management 100 may further comprise one or more motion sensing unit 150 for detecting the movement of the electronic device. The motion sensing unit 150 may comprise at least one of an acceleration sensor (also referred to as an accelerometer) and an angular velocity sensor (also referred to as a gyro sensor) or other motion sensors. The acceleration sensor measures the acceleration of a linear movement, and the angular velocity sensor measures the acceleration of a rotational movement. The motion sensing unit 150 is configured to detect the movement of the electronic device, generate sensed data based on the detected movement, and sends the sensed data to the processing unit 130. The processing unit 130 may then determine whether the electronic device has been flipped over based on the sensed data provided by the motion sensing unit 150 (e.g. the acceleration sensor). It is to be noted that, that the electronic device is flipped over means that the electronic device is being rotated about 180 degrees or turns upside down (i.e. turns from a first side to its opposite side). For example, when a user turns the electronic device from its front side to its rear side, it is determined that the electronic device has been flipped over. In some embodiments, the motion sensing unit 150 may further comprise a light sensor and a proximity sensor to detect/sense light condition so as to provide sensed data for determining whether the electronic device has been flipped over.

The system for alarm management 100 may further comprise an image input unit 160. The image input unit 160 may be one or more optical sensors configured to capture images. For example, the image input unit 160 may be one or more charge-coupled devices (CCD) or complementary metal-oxide-semiconductor (CMOS) sensors, but the invention is not limited thereto. The system for alarm management 100 may further comprise an audio unit 170, such as a microphone, for detecting/measuring audio signal strengths. The motion sensing unit 150, the image input unit 160 and the audio unit 170 can be used to provide information regarding whether the electronic device has been flipped over to the processing unit 130.

Figure 2:
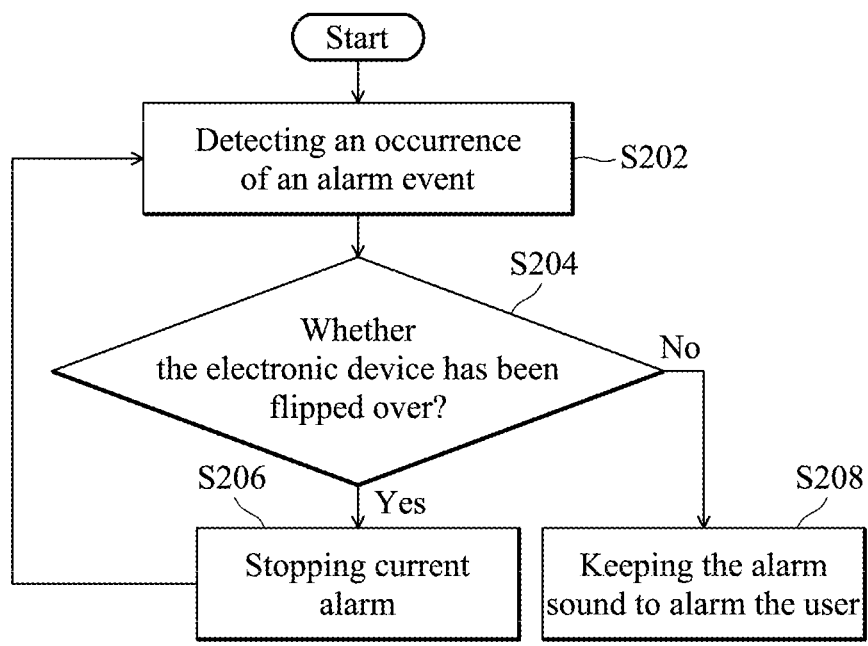
FIG. 2 is a flowchart of an embodiment of a method for alarm management of the invention.

FIG. 2 is a flowchart of an embodiment of a method for alarm management of the invention. The method for alarm management can be used for an electronic device, such as a PDA, a smartphone, a mobile phone, an MID, a laptop computer, a car computer, a digital camera, a multi-media player, a gaming device, or any other type of mobile computational device, however, it is to be understood that the invention is not limited thereto. In this embodiment, a predefined alarm event that occurs at a predefined hour is set.

In step S202, a predefined alarm event occurs at a predefined time and thus an occurrence of an alarm event is detected. In response to detecting an occurrence of an alarm event, it is then determined, in step S204, whether the electronic device has been flipped over. In this embodiment, the alarm event is a snooze alarm event. In some embodiments, determination of whether the electronic device has been flipped over can be based on the motion sensing unit 150 (e.g. an accelerometer) of the electronic device. The motion sensing unit 150 may detect the movement of the electronic device, generate sensed data based on the detected movement and send the sensed data to the processing unit 130. The processing unit 130 may then determine whether the electronic device has been flipped over based on the sensed data. For example, if the sensed data indicates that the electronic device is being rotated about 180 degrees or it is turning upside down (e.g. turning from a first side to its opposite side), the processing unit 130 may determine the electronic device as being flipped over. In some embodiments, the motion sensing unit 150 is always activated and thus it can be used to provide information about whether the electronic device has been flipped over in response to detecting the occurrence of the alarm event. In some embodiments, for power saving, the motion sensing unit 150 is activated only when the occurrence of the alarm event has been detected. To be more specific, the motion sensing unit 150 may first be deactivated prior to detecting the occurrence of the alarm event and may then be activated for providing information about whether the electronic device has been flipped over in response to detecting the occurrence of the alarm event.

In some embodiments, determination of whether the electronic device has been flipped over can be based on image information captured by the image input unit 160 (e.g. a CCD camera) of the electronic device. Similarly, in some embodiments, the image input unit 160 is always activated and thus it can be used to capture images to provide information about whether the electronic device has been flipped over in response to detecting the occurrence of the alarm event. In some embodiments, for power saving, the image input unit 160 is activated only when the occurrence of the alarm event has been detected. To be more specific, the image input unit 160 may first be deactivated prior to detecting the occurrence of the alarm event and may then be activated for capturing images to provide information about whether the electronic device has been flipped over in response to detecting the occurrence of the alarm event.

In some embodiments, the system for alarm management 100 may further record a flipping status of the electronic device for indicating whether the electronic device has been flipped over and determination of whether the electronic device has been flipped over can be based on the flipping status of the electronic device. In some embodiments, the flipping status of the electronic device is provided in response to detecting the occurrence of the alarm event. The electronic device is determined as being flipped over when the flipping status of the electronic device indicates that the electronic device has been changed.

In some embodiments, determination of whether the electronic device has been flipped over can be based on audio signal strengths detected/measured by the audio unit 170 (e.g. a microphone) of the electronic device. Similarly, in some embodiments, the audio unit 170 is always activated and thus it can be used to receive and measure audio signal strengths to provide information about whether the electronic device has been flipped over in response to detecting the occurrence of the alarm event. In some embodiments, for power saving, the audio unit 170 is activated only when the occurrence of the alarm event has been detected. To be more specific, the audio unit 170 may first be deactivated prior to detecting the occurrence of the alarm event and may then be activated for measuring audio signal strengths to provide information about whether the electronic device has been flipped over in response to detecting the occurrence of the alarm event. The electronic device is determined as being flipped over when the audio signal strengths detected/measured by the audio unit 170 indicates a great variation in audio signal strengths over a predetermined threshold. For example, when the electronic device is being flipped over from the front side of the electronic device to the rear side of the electronic device, the measured audio signal strength will be changed from a lower strength (e.g. a quieter voice) to a higher strength (e.g. a louder voice) due to that the audio unit 170 (e.g. the microphone) is configured on its rear side. Therefore, the electronic device can be determined as being flipped over when the audio signal strengths detected/measured by the audio unit 170 indicates a great variation in audio signal strengths over a predetermined threshold.

When the electronic device is determined as being flipped over (Yes in step S204), which means that the user wishes to temporarily stop the alarm, in step S206, current alarm is stopped and next snooze alarm is further created if the alarm type is a snooze alarm. The procedure returns to step S202 for the next snooze alarm. When the electronic device is determined as not being flipped over (No in step S204), in step S208, which means that the user may still in sleeping, the alarm sound is kept playing to alarm the user.

After an alarm occurs, the processing unit 130 may further determine whether an end signal is inputted (e.g. whether a specific key for terminating the alarm has been pressed). If there is an end signal input, the processing unit 130 terminates/deactivates the alarm function, e.g. the snooze function.

After the current alarm occurrence is stopped and if there is no end signal input after an alarm occurrence, the processing unit 130 may further determine whether the number of the current alarm occurrence satisfies a predefined alarm frequency. For example, if a predefined alarm frequency is three times, the processing unit determines whether a current occurring alarm is the third one generated. If a predefined alarm frequency is satisfied, the processing unit 130 terminates an alarm function. Otherwise, the processing unit 130 generates the next alarm and returns to step S202.

Figure 3A:
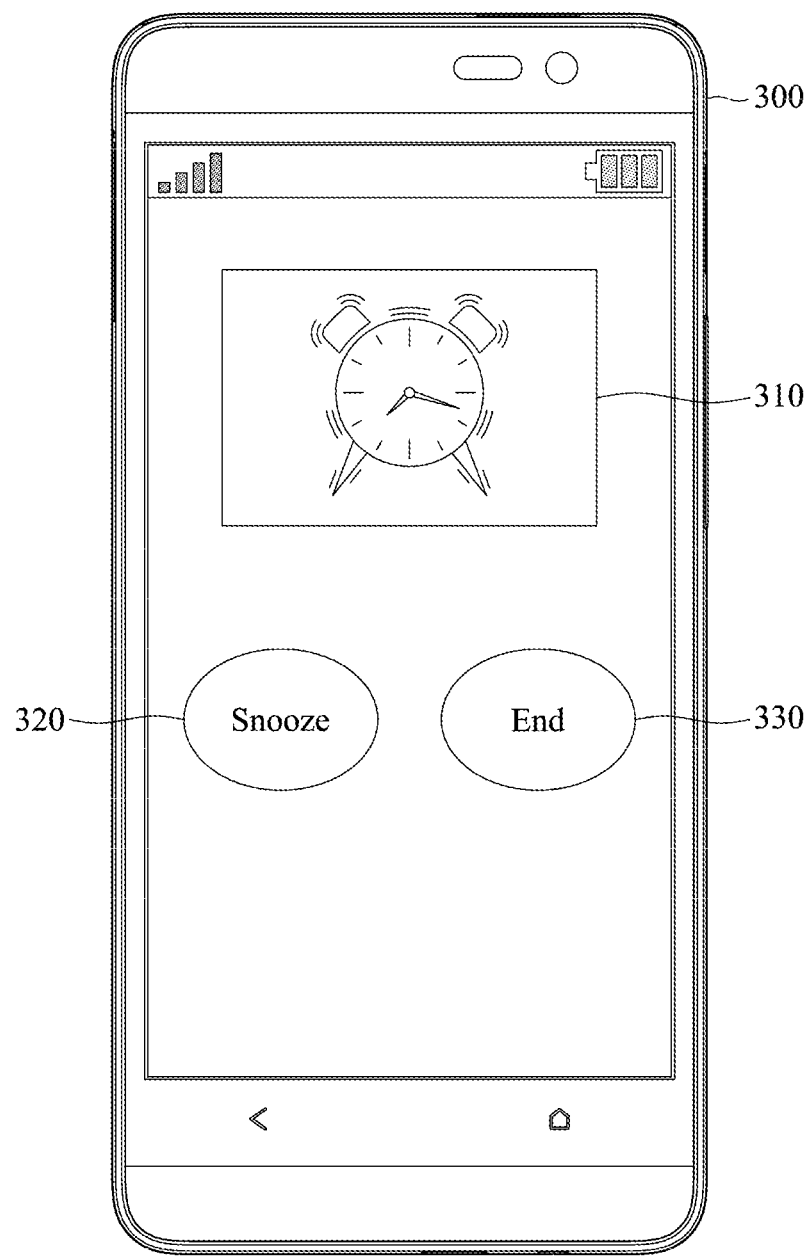
FIG. 3A is a schematic diagram illustrating an embodiment of a screen view of the invention when an occurrence of an alarm event is detected.
Figure 3B:
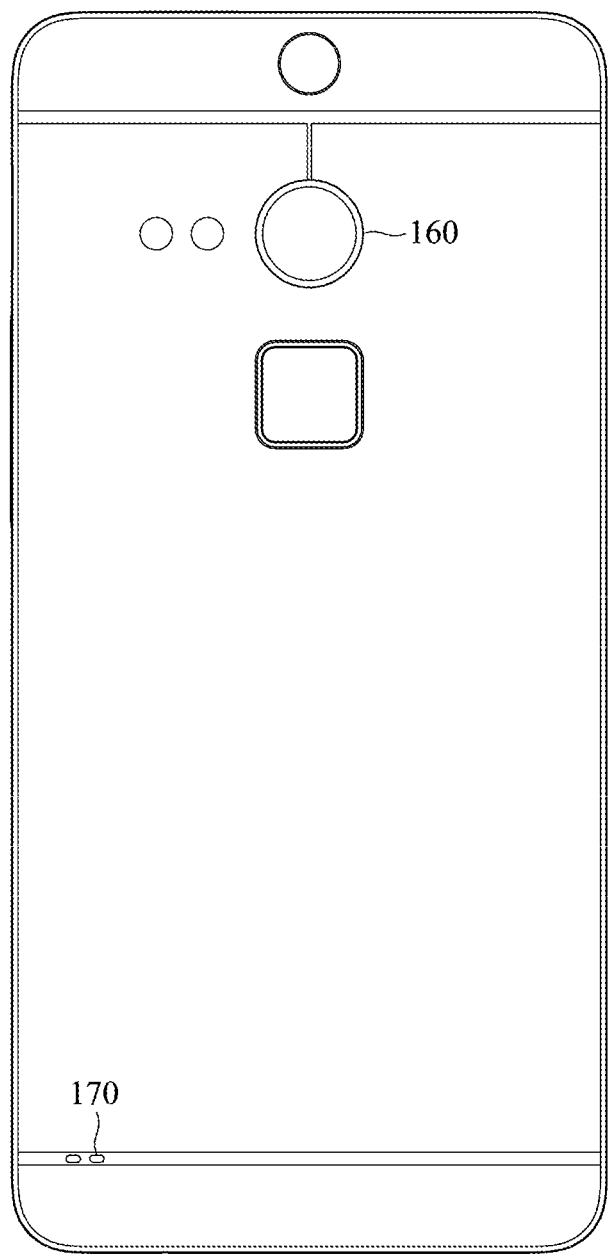
FIG. 3B is a schematic diagram illustrating an embodiment of a flipped device of the invention.

For example, refer to FIGS. 3A and 3B. FIG. 3A is a schematic diagram illustrating an embodiment of a screen view of the invention when an occurrence of an alarm event is detected and FIG. 3B is a schematic diagram illustrating an embodiment of a flipped over device of the invention. As shown in FIG. 3A, an indication screen 300 is presented on the screen 140 when an occurrence of an alarm event is detected, wherein the indication screen 300 includes an alarm indication 310 for indicating the occurrence of the alarm event and at least a snooze key 320 for snoozing the alarm and an end key 330 for terminating the alarm. The user may determine to snoozes the alarm by pressing the snooze key 320 or to terminate the alarm by pressing the end key 330. In this example, assume that a predefined alarm event that occurs at a predefined time is set and the motion sensing unit 150 (e.g. the acceleration sensor) is deactivated prior to detecting the occurrence of the alarm event. The processing unit 130 may set a snooze alarm to sound at a certain time according to predetermined alarm settings so that an alarm event occurs at the certain time. For example, if the alarm settings are set to one-time alarm on Friday (the alarm type), five a.m. (the certain time), ten minutes (the alarm cycle), and four times (the alarm frequency), alarm sounds will occur four times at ten-minute intervals from five a.m. on specified Friday. Unless there is an input for stopping an alarm, the current alarm occurrence continues for 30 seconds. At the time five a.m., an occurrence of an alarm event is detected and an indication screen 300 as shown in FIG. 3A is presented on the screen 140 for notifying the user the alarm event. Meanwhile, the motion sensing unit 150 is activated for providing information about whether the electronic device has been flipped over. When the user in sleep hears the alarm sound and wishes to temporarily stop the alarm, the user flips the electronic device over as shown in FIG. 3B. Thus, the activated motion sensing unit 150 detects that the electronic device has been flipped over and provides sensed data including information indicating that the electronic device has been flipped over to the processing unit 130. Thus, the processing unit 130 determines that the electronic device has been flipped over based on the sensed data and stops current alarm. After the current alarm occurrence is stopped and if there is no end signal input (e.g. the end key 330 has not been pressed) after an alarm occurrence, the processing unit 130 may further determine whether the number of the current alarm occurrence satisfies a predefined alarm frequency (e.g. four times). If the predefined alarm frequency is not satisfied, the processing unit 130 creates next snooze alarm. If the predefined alarm frequency is satisfied, the processing unit 130 terminates the alarm function.

Therefore, the methods and systems for alarm management can allow the user to manage alarm function of an electronic device by flipping the electronic device while a snooze alarm occurs without touching anything on the electronic device, thus enhancing device value and increasing better user experience.

Methods for alarm management, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer-implemented method for alarm management for use in an electronic device, comprising:
   setting a predefined alarm event that occurs at a predefined time for detecting an occurrence of an alarm event;
   in response to detecting the occurrence of the alarm event, detecting, by the electronic device, movement of the electronic device and determining, by the electronic device, whether the electronic device has been flipped over according to the movement of the electronic device detected; and
   stopping current alarm in response to a determination that the electronic device has been flipped over,
   wherein the step of determining whether the electronic device has been flipped over comprises determining whether the movement of the electronic device detected indicates that the electronic device is being rotated about 180 degrees and the electronic device is determined as being flipped over when the movement of the electronic device detected indicates that the electronic device is being rotated about 180 degrees,
   wherein the step of determining whether the electronic device has been flipped over further comprises determining whether the electronic device has been flipped over based on sensed data provided by a motion sensing unit of the electronic device, and
   wherein the motion sensing unit is deactivated prior to detecting the occurrence of the alarm event and is activated in response to detecting the occurrence of the alarm event.

2. The method of claim 1, wherein the determination step further comprises:
   determining whether the electronic device has been flipped over based on image information captured by an image input unit of the electronic device.

3. The method of claim 1, wherein the image input unit is deactivated prior to detecting the occurrence of the alarm event and is activated in response to detecting the occurrence of the alarm event.

4. The method of claim 1, wherein the determination step further comprises:
   determining whether the electronic device has been flipped over based on audio signal strengths detected/measured by an audio unit of the electronic device.

5. The method of claim 4, wherein the audio unit is deactivated prior to detecting the occurrence of the alarm event and is activated in response to detecting the occurrence of the alarm event.

6. The method of claim 1, further comprising:
   generating an alarm occurrence at a predefined time;
   determining whether the number of the stopped alarm occurrence satisfies a predefined alarm frequency; and
   terminating the alarm function in response to the predefined alarm frequency is satisfied.

7. A system for alarm management for use in an electronic device, comprising:
   a wireless communication unit;
   a motion sensing unit; and
   a processing circuit coupled to the wireless communication unit, configured to set a predefined alarm event that occurs at a predefined time for detecting an occurrence of an alarm event, detect movement of the electronic device and determine whether the electronic device has been flipped over according to the movement of the electronic device detected in response to detecting the occurrence of the alarm event, and stop current alarm in response to a determination that the electronic device has been flipped over,
   wherein the processing circuit further determines whether the electronic device has been flipped over by determining whether the movement of the electronic device detected indicates that the electronic device is being rotated about 180 degrees and the processing circuit further determines that the electronic device is determined as being flipped over when the movement of the electronic device detected indicates that the electronic device is being rotated about 180 degrees,
   wherein the processing circuit is further configured to determine whether the electronic device has been flipped over based on sensed data provided by the motion sensing unit equipped with the electronic device, and
   wherein the processing circuit is further configured to deactivate the motion sensing unit prior to detecting the occurrence of the alarm event and activate the motion sensing unit in response to detecting the occurrence of the alarm event.

8. The system for alarm management of claim 7, further comprising an image input unit, wherein the processing circuit is further configured to determine whether the electronic device has been flipped over based on image information captured by the image input unit of the electronic device.

9. The system for alarm management of claim 8, wherein the processing circuit deactivates the image input unit prior to detecting the occurrence of the alarm event and activates the image input unit in response to detecting the occurrence of the alarm event.

10. The system for alarm management of claim 7, further comprising an audio unit, wherein the processing circuit is further configured to determine whether the electronic device has been flipped over based on audio signal strengths detected/measured by the audio unit of the electronic device.

11. The system for alarm management of claim 10, wherein the processing circuit further deactivates the audio unit prior to detecting the occurrence of the alarm event and activates the audio device in response to detecting the occurrence of the alarm event.

12. A non-transitory machine-readable storage medium comprising a computer program, which, when executed, causes a device to perform a method for alarm management, wherein the method comprises:

setting a predefined alarm event that occurs at a predefined time for detecting an occurrence of an alarm event;

in response to the occurrence of the alarm event, detecting, by a motion sensing device of the device, movement of the device and determining whether the device has been flipped over according to the movement of the electronic device detected; and stopping current alarm in response to a determination that the device has been flipped over, wherein the step of determining whether the electronic device has been flipped over comprises determining whether the movement of the electronic device detected indicates that the electronic device is being rotated about 180 degrees and the electronic device is determined as being flipped over when the movement of the electronic device detected indicates that the electronic device is being rotated about 180 degrees, wherein the step of determining whether the electronic device has been flipped over further comprises determining whether the electronic device has been flipped over based on sensed data provided by the motion sensing unit of the electronic device, and wherein the motion sensing unit is deactivated prior to detecting the occurrence of the alarm event and is activated in response to detecting the occurrence of the alarm event.

* * * * *